United States Patent Office 2,784,095
Patented Mar. 5, 1957

2,784,095

TEMPERING OR SEEDING OF CHOCOLATE

Walter Denis Meagher and George Meagher,
St. Annes-on-Sea, England

Application March 3, 1954, Serial No. 413,876

Claims priority, application Great Britain
February 25, 1953

5 Claims. (Cl. 99—23)

This invention relates to the tempering or seeding of chocolate intended for use in the complete or partial enrobing of ice-cream blocks, biscuits and other confections.

Such tempering or seeding consists essentially in first melting the chocolate to a temperature of 135° F. or thereabouts (depending upon the particular make of chocolate in use), allowing it to cool to a temperature of 85° F., and finally re-heating slowly to 90° F., at which temperature it may be delivered to the curtain-forming or other depositing means incorporated in the enrobing apparatus.

In the absence of such pre-treatment, the "converture" obtained on the final product does not set as it should, and such product exhibits, either immediately or after a relatively short shelf-life, an unsightly "grey bloom" due to crystallization of the cocoa-butter fat.

It is known practice in connection with chocolate enrobing to provide the container or "kettle" for the molten cnocolate with "seeding" and "working" compartments which intercommunicate by means of a small orifice and whose temperature is controlled by separate hot-water jackets. The pre-treatment aforesaid is applied to the relatively small quantity of chocolate in the "seeding" compartment, which chocolate is then employed to temper the mass of material in the "working" compartment.

The object of the present invention is to provide a simple but effective means, readily incorporable in an enrobing or like machine, for effecting a continuous tempering of the chocolate in use and thereby obviating any risk of the chocolate supplied to the curtain or its equivalent becoming deficient in temper during operation of the machine.

According to this invention, in a "kettle" or container for molten chocolate having "seeding" and "working" compartments which intercommunicate by means of a small orifice, the (or each) wall defining a part of the "seeding" compartment is left unheated or deliberately chilled so that the adjacent chocolate tends to set thereon, this relatively small proportion of the total contents of the "kettle" or container being continuously scraped off the wall aforesaid by mechanical means which ensure its re-admixture with the main mass.

Preferably the two compartments contain separate rotary agitators mounted on a common shaft, the agitator in the "seeding" compartment having a part of its outer end arranged with a minimum of clearance from the adjacent wall of the compartment, and such wall being unheated or cooled as aforesaid.

The present invention also comprises a method of tempering or seeding chocolate which comprises feeding the chocolate at about 135° F. into a "seeding" compartment in permanent communication with a "working" compartment, the contents of said compartment being maintained at temperatures of approximately 85° F. and 90° F. respectively, but said seeding compartment having a relatively cool wall, circulating chocolate from the "working" to the "seeding" compartment externally of said "kettle" or container, continuously dislodging any chocolate which congeals upon the said relatively cool wall of the "seeding" compartment, and re-admixing said dislodged chocolate with the main mass.

Figure 1:
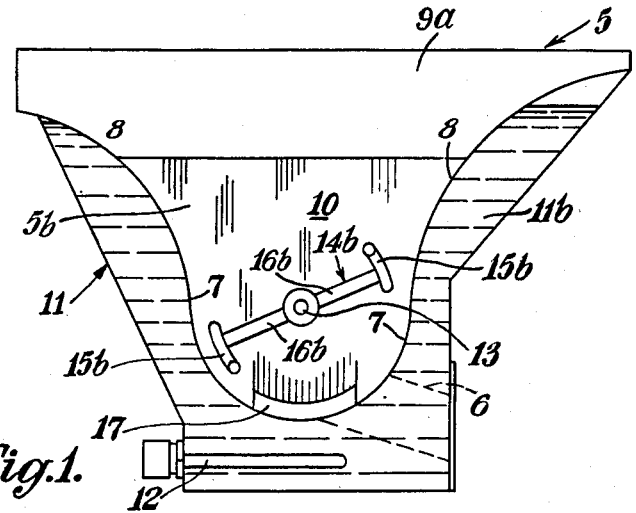
Fig. 1 is a cross-section of a "kettle" or chocolate container embodying the present invention and viewed from the left-hand end of Fig. 2.
Figure 2:
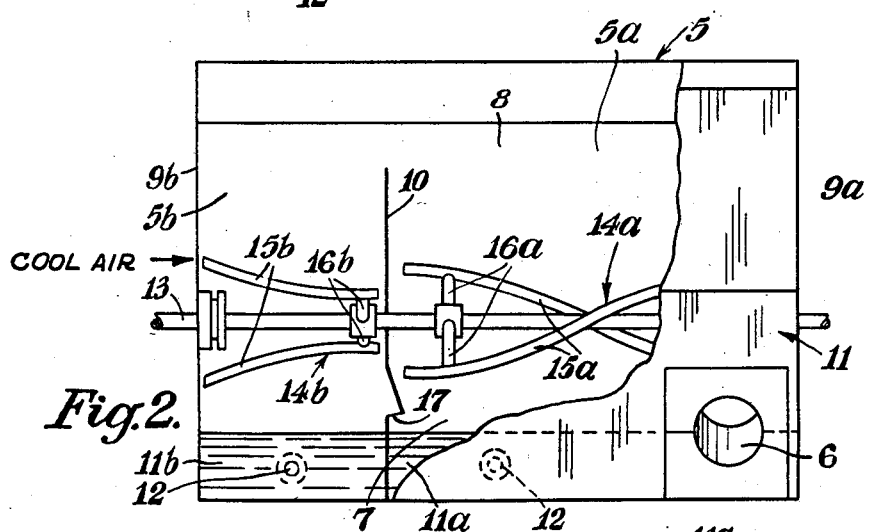
Fig. 2 is a part-sectional side elevation.
Figure 3:
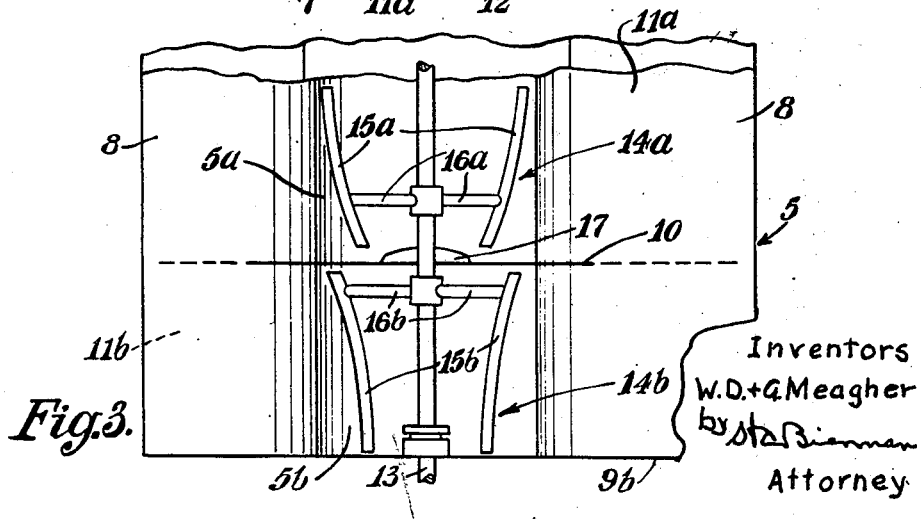
Fig. 3 is a fragmentary plan view of the same.

In the example illustrated, the invention is applied to the "kettle" or chocolate container 5 of a known form of enrobing machine in which the "working" chocolate is drawn directly from the "kettle" or container through a pipe 6 and pumped to a curtain-forming fishtail nozzle or equivalent means (not shown).

The "kettle" 5 has a part-cylindrical lower portion 7 and outwardly flaring sides 8 which are connected together by flat vertical end walls 9a, 9b, and also by a transverse partition 10 of somewhat less height than the latter.

The sides 8 and lower portion 7 of the "kettle" 5 are enclosed externally to provide a hot-water jacket 11 containing electric heating elements 12, and both the "kettle" 5 and its jacket 11 are divided into two unequal parts (5a, 5b and 11a, 11b, respectively) by the transverse partition 10.

Extending longitudinally of the "kettle" 5 and mounted in the end walls 9 of the latter concentric with its part-cylindrical lower portion 7 is a rotary shaft 13 on which two agitators 14a, 14b are fixed.

Each of such agitators conveniently comprises two helically curved blades 15a (or 15b) connected to the shaft 13 near their ends by means of radial spokes 16a (or 16b), each such spoke being diametrically opposed to the corresponding spoke carrying the other blades.

Both ends of the agitator 14a in the larger or "working" compartment 5a of the "kettle" may have substantial axial clearance from the ends 9a, 10, of such compartment, but the agitator 14b in the smaller or "seeding" compartment 5b has at least one of its helical blades 15b extended so as to have a minimum of clearance from the outer end wall 9b of such compartment.

This end wall 9b remains substantially cooler than the rest of the "seeding" compartment 5b inasmuch as the heating jacket 11b does not extend thereto, or alternatively it may be deliberately chilled either by means of external radiating fins thereon, or by a stream or streams of cold air delivered against its exterior by a blower, or by circulation of cold water or a refrigerant medium through pipes or a jacket in contact with its exterior.

In operating the enrobing machine, chocolate previously heated to 135° F. or thereabouts is fed into the "seeding" compartment 5b in known manner and passes therefrom into the "working" compartment 5a through a louvred orifice 17 at the lower part of the partition wall 10, the "kettle" heating means 12 being suitably adjusted to give a temperature of 85° F. in the "seeding" compartment 5b and 90° F. in the "working" compartment 5a.

After being circulated through the chocolate pump (not shown) and the curtain-forming device, the chocolate is returned to the "seeding" compartment 5b, when a small proportion thereof immediately sets hard on coming into contact with the chilled end wall 9b.

As the shaft 13 rotates, the extended blade or blades 15b of the "seeding" agitator 14b continually scrape off this set chocolate in the form of small chips or shavings which are stirred in with the rest of the "seeding" chocolate, and, by passage through the communicating orifice 17, serve to temper the agitated mass of material in the "working" compartment 5a.

Obviously, if desired, the set chocolate may be removed from the chilled wall 9b of the "seeding" compartment by scraping means separate and distinct from the agitator 14b.

We claim:

1. Apparatus for treating molten chocolate comprising a container having an approximately semi-cylindrical horizontal chamber in the lower part thereof, a jacket for fluid for heating said chamber, a transverse partition in said chamber forming a seeding and a working compartment, an orifice in said partition, horizontally mounted rotatable agitators in said compartments, means for cooling the wall of said seeding compartment opposite to said partition to cause said chocolate to set thereon, said agitator in said seeding compartment adapted to scrape off set chocolate from said wall and mix the same with the main mass of chocolate.

2. Apparatus for treating molten chocolate comprising a container having an approximately semi-cylindrical horizontal chamber in the lower part thereof, a jacket for fluid for heating said chamber, a transverse partition in said chamber forming a seeding and a working compartment, an orifice in said partition, horizontally mounted rotatable agitators in said compartments, means for cooling the wall of said seeding compartment opposite to said partition to cause said chocolate to set thereon, said agitator in said seeding compartment being arranged with a minimum of clearance from said wall and being adapted to scrape off set chocolate from said wall and mix the same with the main mass of chocolate.

3. Apparatus for treating molten chocolate comprising a container having an approximately semi-cylindrical horizontal chamber in the lower part thereof, a jacket for fluid for heating said chamber, a transverse partition in said chamber forming a seeding and a working compartment, an orifice in said partition, horizontally mounted rotatable agitators in said compartments, means for cooling the wall of said seeding compartment opposite to said partition to cause said chocolate to set thereon, said agitator in said seeding compartment adapted to scrape off set chocolate from said wall and mix the same with the main mass of chocolate, both of said agitators being mounted on the same shaft for simultaneous operation thereof.

4. Apparatus for treating molten chocolate comprising a container having an approximately semi-cylindrical horizontal chamber in the lower part thereof, a jacket for fluid for heating said chamber, a transverse partition in said chamber forming a seeding and a working compartment, an orifice in said partition, horizontally mounted rotatable agitators in said compartments, said orifice being below the level of said agitators, means for cooling the wall of said seeding compartment opposite to said partition to cause said chocolate to set thereon, said agitator in said seeding compartment adapted to scrape off set chocolate from said wall and mix the same with the main mass of chocolate.

5. Apparatus for treating molten chocolate comprising a container having an approximately semi-cylindrical horizontal chamber in the lower part thereof, a jacket for fluid for heating said chamber, a transverse partition in said chamber forming a seeding and a working compartment, an orifice in said partition, horizontally mounted rotatable agitators in said compartments, means for cooling the wall of said seeding compartment opposite to said partition to cause said chocolate to set thereon, said agitator in said seeding compartment adapted to scrape off set chocolate from said wall and mix the same with the main mass of chocolate, said cooling means being in contact with outer face of said opposite wall.

References Cited in the file of this patent

UNITED STATES PATENTS

| | | |
|---|---|---|
| 1,727,444 | Prescott | Sept. 10, 1929 |
| 1,898,829 | Greer | Feb. 21, 1933 |
| 1,932,931 | Greer et al. | Oct. 31, 1933 |
| 2,023,741 | Moir | Dec. 10, 1935 |
| 2,216,777 | Hollstein | Oct. 8, 1940 |
| 2,313,705 | Jack | Mar. 9, 1943 |
| 2,558,449 | Maranz | June 26, 1951 |

FOREIGN PATENTS

| | | |
|---|---|---|
| 953,603 | France | May 23, 1949 |